(12) United States Patent
Tanaka et al.

(10) Patent No.: US 11,966,115 B1
(45) Date of Patent: Apr. 23, 2024

(54) DISPLAY DEVICE

(71) Applicant: Japan Display Inc., Tokyo (JP)

(72) Inventors: Yoshinori Tanaka, Tokyo (JP); Keita Ono, Tokyo (JP); Keiji Tago, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/490,253

(22) Filed: Oct. 19, 2023

(30) Foreign Application Priority Data

Oct. 26, 2022 (JP) ................. 2022-171522

(51) Int. Cl.
*G02F 1/1335* (2006.01)
*F21V 8/00* (2006.01)
*G02F 1/13357* (2006.01)

(52) U.S. Cl.
CPC ..... *G02F 1/133524* (2013.01); *G02B 6/0076* (2013.01); *G02F 1/133615* (2013.01)

(58) Field of Classification Search
None
See application file for complete search history.

(56) References Cited

U.S. PATENT DOCUMENTS

2020/0310175 A1* 10/2020 Okuyama ............. G02F 1/1334
2021/0132279 A1   5/2021 Numata et al.

FOREIGN PATENT DOCUMENTS

JP           202016724 A      1/2020

* cited by examiner

*Primary Examiner* — Phu Vu
(74) *Attorney, Agent, or Firm* — Maier & Maier, PLLC

(57) ABSTRACT

Used is a display device including: a first substrate having a first front surface and a first back surface located on an opposite side of the first front surface; a second substrate having a second back surface opposing the first front surface and a second front surface located on an opposite side of the second back surface; a liquid crystal layer arranged between the first front surface of the first substrate and the second back surface of the second substrate; a first light guide plate adhesively fixed onto the second front surface of the second substrate via a first adhesive layer; and a light source unit arranged at a position opposing a first side surface of the first light guide plate, in which refractive index of the first light guide plate is lower than refractive index of the first adhesive layer.

5 Claims, 5 Drawing Sheets

DISPLAY DEVICE

CROSS-REFERENCE TO RELATED APPLICATION

The present application claims priority from Japanese Patent Application No. 2022-171522 filed on Oct. 26, 2022, the content of which is hereby incorporated by reference into this application.

TECHNICAL FIELD

The present invention relates to a display device using a liquid crystal layer.

BACKGROUND

As a display device using a liquid crystal layer, there is a transparent display device that allows an observer to recognize a displayed image and a background as being superimposed by improving light transmittance of substrates sandwiching the liquid crystal layer. Patent Document 1 (Japanese Patent Application Laid-open No. 2020-16724) discloses that in order to prevent luminance on an opposite side from decreasing in comparison with luminance on a side of arranging a light source unit, a transparent layer lower in refractive index than a transparent substrate whose side surface opposes a light emitting element is provided, luminance gradient depending on a distance from the light source unit is suppressed, and uniformity of luminance is achieved regardless of the distance from the light source unit.

SUMMARY

The inventors of the present application are developing a transparent display device that allows the observer to recognize the displayed image and the background by superimposing them on each other. In a case of the transparent display device, each of front and back surfaces needs to have properties of transmitting visible light. Consequently, the light source unit for displaying the images is arranged on a side surface of a light guide plate. According to studies by the inventors of the present application, it has been found that the following problems occur when the light source unit is arranged so as to oppose the side surface of the light guide plate. That is, in the transparent display device, if the refractive index of the light guide plate is not selected appropriately, there is a problem in which light source light does not reach the liquid crystal layer and the luminance decreases. Alternatively, in such a case, there is a problem in which measures such as an increase in a thickness of the light guide plate in order to improve the luminance gradient as disclosed in Patent Document 1 are not sufficiently effective.

An object of the present invention is to provide a technique for improving performance of the display device.

Other objects and novel features will become apparent from the description of the present specification and the accompanying drawings.

The effects obtained by typical embodiments of the invention disclosed in the present application will be briefly described below.

A display device that is one embodiment includes: a first substrate having a first front surface and a first back surface located on an opposite side of the first front surface; a second substrate having a second back surface opposing the first front surface and a second front surface located on an opposite side of the second back surface; a liquid crystal layer arranged between the first front surface of the first substrate and the second back surface of the second substrate; a first light guide plate adhesively fixed onto the second front surface of the second substrate via a first adhesive layer; and a light source unit arranged at a position opposing a first side surface of the first light guide plate, in which refractive index of the first light guide plate is lower than refractive index of the first adhesive layer.

DRAWINGS

PREFERRED EMBODIMENTS

Figure 1:
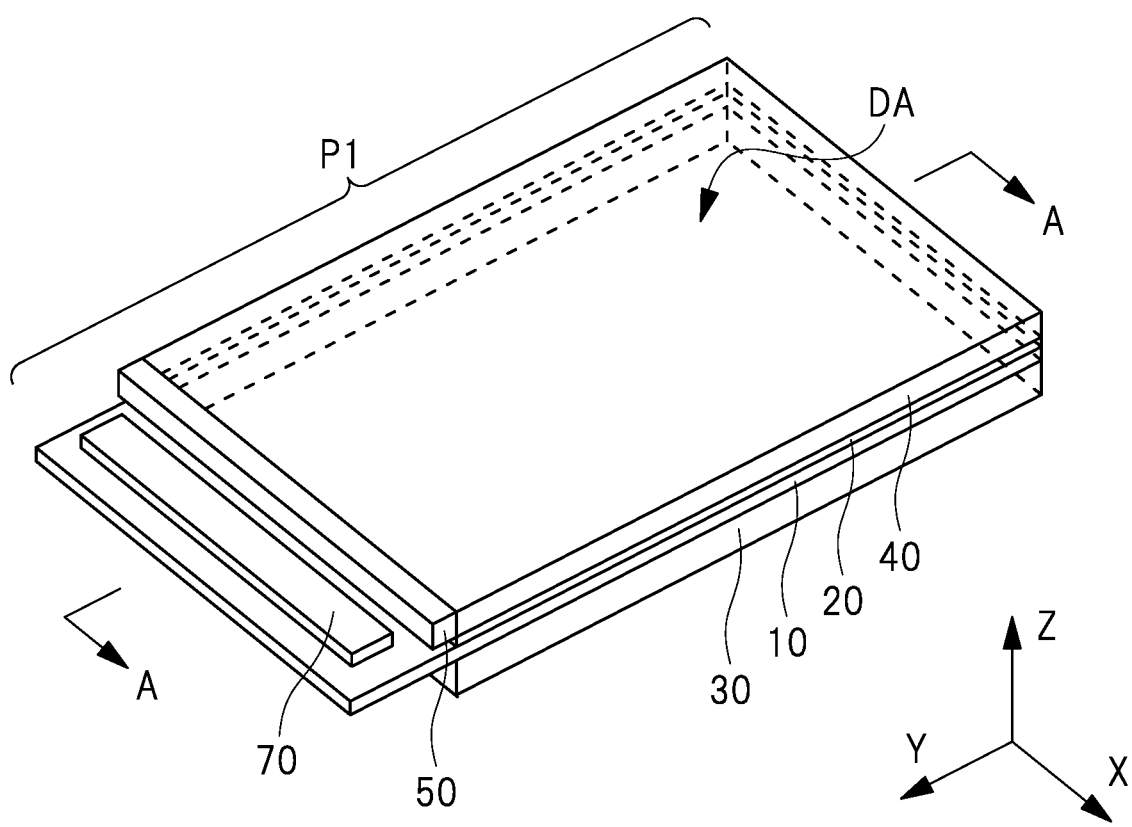
FIG. 1 is a perspective view showing one example of a transparent display device according to an embodiment.

Note that the disclosure is mere an example, and any alteration that is easily made by a person skilled in the art while keeping a gist of the present invention is included in the present invention. In addition, the drawings schematically illustrate a width, a thickness, a shape and the like of each portion as compared to actual aspects in order to make the description clearer, but the drawings are mere examples and do not limit the interpretation of the present invention. In addition, the same reference characters are applied to the same elements as those described in relation to the foregoing drawings in the present specification and the respective drawings, and detailed descriptions thereof will be appropriately omitted in some cases.

In the following embodiments, a liquid crystal display device that uses scattering of visible light by liquid crystal molecules to display an image will be detailed with and described as an example of a display panel used in combination with a glass plate.

Further, the liquid crystal display device is a device that forms a displayed image by changing orientation of molecules contained in a liquid crystal layer, but requires a light source. In the embodiments described below, the light source is provided separately from the display panel. Therefore, in the following description, the display panel and a light source module that supplies visible light to the display panel will be distinguished and explained.

<Room for Improvement>

In order to improve characteristics such as luminance and luminance gradient of a transparent display device (transparent display panel device), it is conceivable to incorporate a design technique such as selection of a thickness of a light guide plate or introduction of a low refractive index layer pattern. However, if the refractive index of the light guide plate is not selected appropriately, light source light may not reach a liquid crystal layer, resulting in a decrease in luminance. Moreover, in such a case, measures such as an increase in the thickness of the light guide plate to improve luminance gradient may not be sufficiently effective. Such a case will be explained below by using comparative examples. Note that although FIGS. 2, 4, and 5 used in the following description are cross-sectional views, some hatching is omitted to make it easier to understand a course(s) of light.

Figure 4:
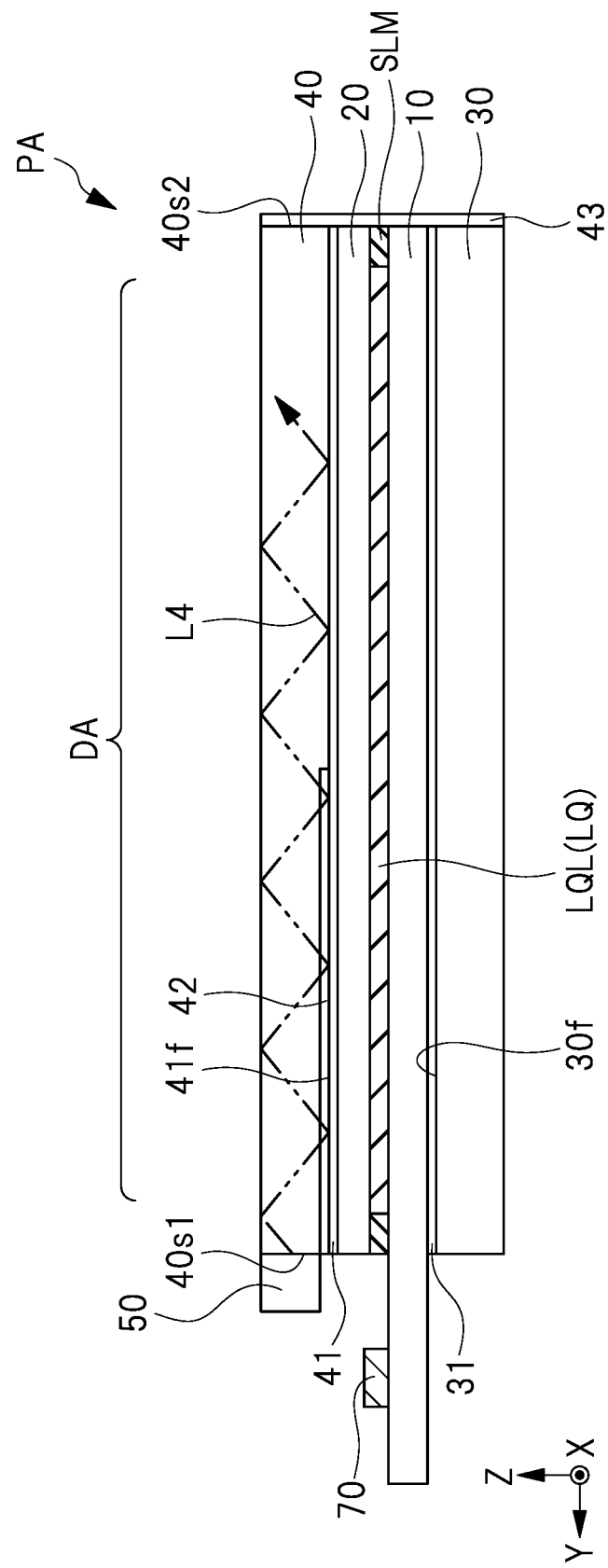
FIG. 4 is an explanatory diagram schematically showing a path of light emitted from a light source unit of a transparent display device of a first comparative example.

FIG. 4 shows a cross section of a transparent display panel that is a transparent display device of a first comparative example. As shown in FIG. 4, a display panel PA of a first comparative example includes a substrate 10, a substrate 20, a light guide plate 30, a light guide plate 40, an adhesive layer 31, an adhesive layer 41, a low refractive index layer 42, a liquid crystal layer LQL, and a light source unit 50, and a drive circuit 70. Here, the light guide plate 30, the adhesive layer 31, the substrate 10, the liquid crystal layer LQL, the substrate 20, the adhesive layer 41, and the light guide plate 40 are laminated in order from a lower side of FIG. 4. Further, the low refractive index layer 42 is formed between the substrate 20 and the light guide plate 40 in a region near the light source unit 50.

The light source unit 50 opposes a side surface $40s1$ of the light guide plate 40, and light source light L4 emitted from the light source unit 50 enters into the light guide plate 40 from the side surface $40s1$.

Here, the refractive index of each of the adhesive layer 31 and the adhesive layer 41 is 1.476. The refractive index of each of the light guide plate 30, the light guide plate 40, the substrate 10, and the substrate 20 is 1.51. Namely, in the display panel PA, the refractive index of the light guide plate 40 on which the light source light L4 is first incident from the light source unit 50 is larger than the refractive index of each of the adhesive layer 31 and the adhesive layer 41. In this case, most of the light source light L4 that has entered into the light guide plate 40 from the light source unit 50 via the side surface $40s1$ is totally reflected at a front surface $41f$ of the adhesive layer 41, which is an interface between the light guide plate 40 and the adhesive layer 41, and proceeds in the light guide plate 40. That is, in a propagation path of the light source light L4, a back surface of the light guide plate 40 and the front surface $41f$ of the adhesive layer 41 are interfaces between a medium with large refractive index and a medium with small refractive index. Therefore, when an incident angle at which the light source light L4 is incident on the front surface $41f$ is larger than a critical angle, the light source light L4 is totally reflected at the front surface $41f$. Specifically, a component of the light source light L4, whose incident angle on the front surface $41f$ of the adhesive layer 41 is larger than or equal to a sin (refractive index of the adhesive layer 41÷refractive index of the light guide plate 40), in components of the light source light is confined within the light guide plate 40.

As a result, less light source light L4 reaches the liquid crystal layer LQL and the light guide plate 30. In this way, presence of the component of the light source light L4 that is confined in the light guide plate 40 by the adhesive layer 41 causes first room for improvement in that the luminance of the entire display panel PA decreases.

Figure 5:
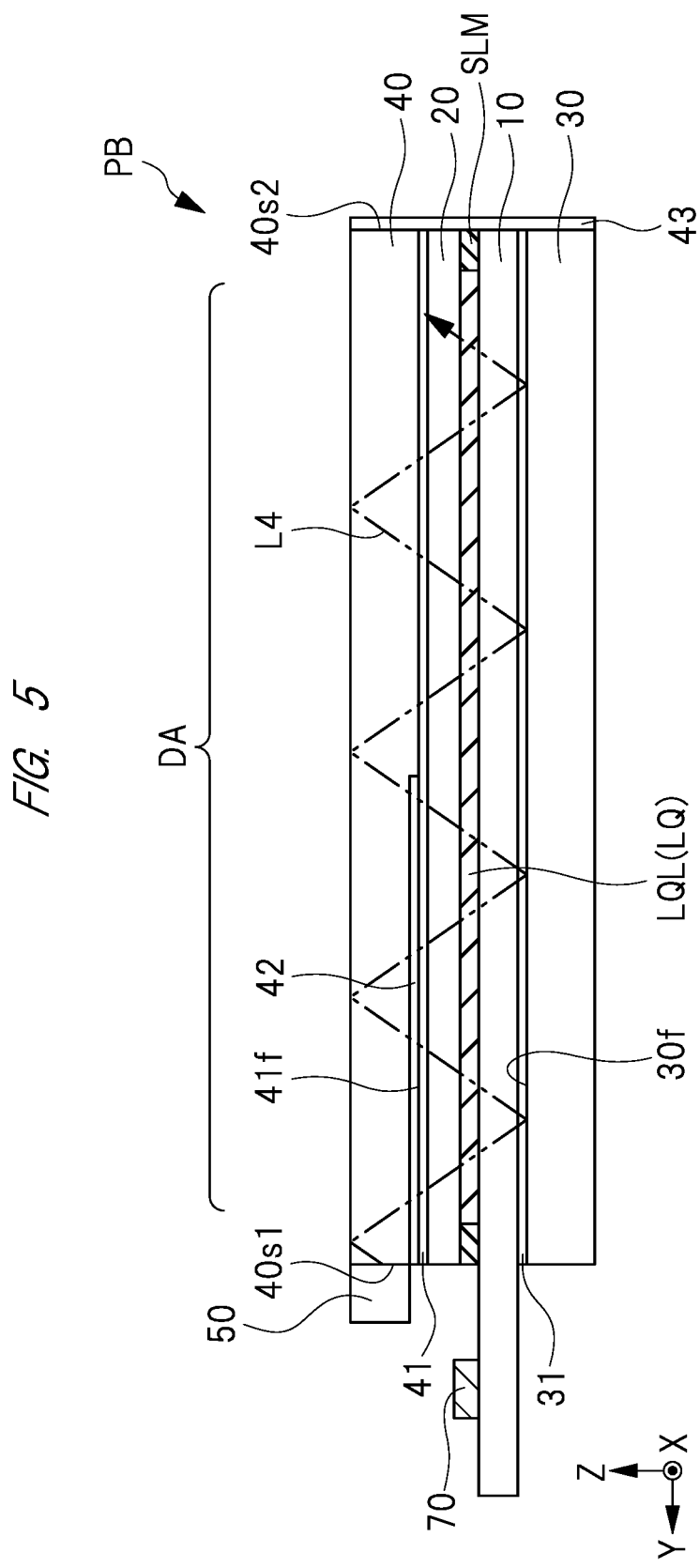
FIG. 5 is an explanatory diagram schematically showing a path of light emitted from a light source unit of a transparent display device of a second comparative example.

Next, FIG. 5 shows a cross section of a transparent display panel, which is a transparent display device of a second comparative example. A structure of a display panel PB of a second comparative example is similar to that of a display panel PA shown in FIG. 4. However, the refractive index of the light guide plate 40 configuring the display panel PB is larger than the refractive index of the light guide plate 30. In this case, as in the first comparative example, most of the light source light L4 that has entered into the light guide plate 40 from the light source unit 50 via the side surface $40s1$ is totally reflected by the front surface $41f$ of the adhesive layer 41, but some of the other light source light L4 passes through the adhesive layer 41 and progresses inside each of the substrate 20, the liquid crystal layer LQL, the substrate 10, and the adhesive layer 31.

However, most of the light source light L4 incident on the front surface $30f$ of the light guide plate 30 from an adhesive layer 31 side is totally reflected at the front surface $30f$ of the light guide plate 30, which is an interface between the adhesive layer 31 and the light guide plate 30, and progresses inside the display panel PB within a range on a light guide plate 40 side rather than the front surface $30f$. In this case, since the light source light L4 hardly reaches the light guide plate 30, a light guide effect due to providing the light guide plate 30 cannot be obtained. Further, even if measures such as an increase in a thickness of the light guide plate 30 are adopted to suppress a luminance gradient phenomenon, an effect of suppressing such a luminance gradient phenomenon cannot be obtained. In this way, there is second room for improvement in that the light source light L4 does not reach the light guide plate 30 and the light guide effect due to the light guide plate 30 cannot be obtained.

In this way, there is the room for improvement in transparent display device. Therefore, in the embodiment of the present application, a devisal is taken to solve the above-mentioned room for improvement. In the following, a technical idea of the embodiment applying this devisal will be explained.

Embodiment

<Structure of Transparent Display Panel>

Figure 2:
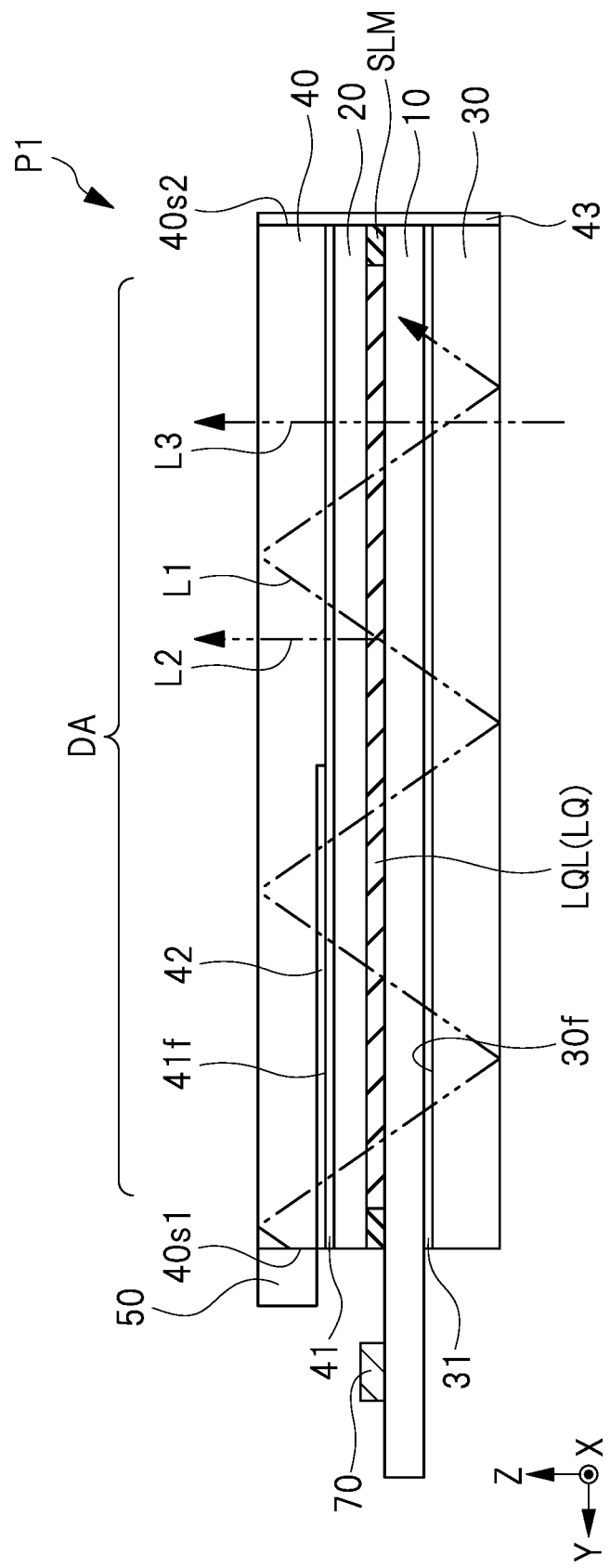
FIG. 2 is a cross-sectional view taken along line A-A in FIG. 1.

First, characteristics of a so-called transparent display panel will be explained. FIG. 1 is a perspective view showing one example of a transparent display panel (transparent display device) that is a display device of the present embodiment. In the following drawings including FIG. 1, the following will be described: a direction along a thickness direction of a display panel P1 is a Z direction; and in a X-Y plane orthogonal to the Z direction a direction in which one side of the display panel P1 extends is an X direction and a direction that intersects with the X direction is a Y direction. FIG. 2 is a cross-sectional view taken along line A-A in FIG. 1.

As shown in FIG. 1, a display panel P1 of the present embodiment includes a substrate (array substrate) 10, a substrate (counter substrate) 20, a light guide plate (also referred to as a first light guide plate or a first cover glass) 30, a light guide plate (also referred to as a second light guide plate or a second cover glass) 40, a light source unit 50, and a drive circuit 70.

In a case of being configured as a display device, in addition to each part included in the display panel P1 shown in FIG. 1, it may include, for example, a control circuit, a flexible substrate connected to the display panel P1, a housing, or the like. In FIG. 1, illustration of parts other than the display panel P1 is omitted.

The display panel P1 has a display region DA in which an image is formed according to an input signal supplied from an outside. Note that although the display region DA of the display panel P1 shown in FIG. 1 is a square, the display region may have a shape other than a square, such as a polygon or a circle. The display region DA is an effective region where the display panel P1 displays an image in a plan view of a display surface. Each of the substrate 10, the substrate 20, the light guide plate 30, and the light guide plate 40 is located at a position overlapping the display region DA in a plan view. In an example shown in FIG. 1, the drive circuit 70 is mounted on the substrate 10, and the light source unit 50 is provided in contact with the side surface 40s1 of the light guide plate 40. However, as long as light from the light source unit 50 can be emitted into the light guide plate 40 from the side surface 40s1 of the light guide plate 40, a mounting location of the light source unit 50 is not limited to this. For example, the light source unit 50 may be mounted on the substrate 10. The light source unit 50 includes, for example, a plurality of light emitting diode elements.

First, an optical path of light emitted from the light source unit 50 in the display panel P1 shown in FIG. 2 will be described. As shown in FIG. 2, the display panel P1 includes the substrate 10 and the substrate 20 that are bonded so as to oppose each other via a liquid crystal layer LQL. The substrate 10 and the substrate 20 are arranged in the Z direction, which is the thickness direction of the display panel P1. In other words, the substrate 10 and the substrate 20 oppose each other in the thickness direction (Z direction) of the display panel P1. The substrate 10 has a front surface (main surface, surface) opposing the liquid crystal layer LQL (and the substrate 20). Further, the substrate 20 has a back surface (main surface, surface) that opposes the front surface (and liquid crystal layer LQL) of the substrate 10.

The substrate 10 is an array substrate in which a plurality of transistors (transistor elements) as switching elements (active elements) are arranged in an array. This transistor is, for example, a TFT (Thin Film Transistor). Further, the substrate 20 is a substrate provided on a display surface side with respect to the substrate 10, which is the array substrate. The substrate 20 can be referred to as a counter substrate in the sense that it is a substrate arranged opposite the array substrate.

The liquid crystal layer LQL including liquid crystal LQ is located between the front surface of the substrate 10 and the back surface of the substrate 20. The liquid crystal layer LQL is an optical modulation element. The display panel P1 has a function of regulating a state of an electric field formed around the liquid crystal layer LQL via the above-described switching element and modulating light passing therethrough. The display region DA on the substrate 10 and the substrate 20 overlaps the liquid crystal layer LQL in a plan view.

Further, the substrate 10 and the substrate 20 are adhered to each other via a sealing portion (sealing material) SLM. As shown in FIG. 2, the sealing portion SLM is arranged so as to surround the display region DA in a plan view. Namely, the liquid crystal layer LQL is located inside the sealing portion SLM. The sealing portion SLM serves as a seal that seals the liquid crystal between the substrate 10 and the substrate 20. Further, the sealing portion SLM serves as an adhesive for adhering the substrate 10 and the substrate 20 to each other.

The light guide plate 30 is adhesively fixed on the back surface of the substrate 10 via an adhesive layer 31. Further, on the front surface of the substrate 20, the light guide plate 40 is adhesively fixed via an adhesive layer 41. The light guide plate 30 includes a front surface 30f opposing the back surface of the substrate 10 and a back surface on an opposite side of the front surface 30f. The light guide plate 30 is adhesively fixed to the substrate 10 via the adhesive layer 31. In at least the display region DA, a gap between the light guide plate 30 and the substrate 10 is filled with the adhesive layer 31. In an example shown in FIG. 2, the adhesive layer 31 is adhered to the entire front surface 30f of the light guide plate 30.

Similarly, the light guide plate 40 includes a back surface opposing the front surface of the substrate 20 and a front surface on an opposite side of the back surface. The light guide plate 40 also includes a side surface 40s1 opposing the light source unit 50, and a side surface 40s2 located on an opposite side of the side surface 40s1. Each of the side surface 40s1 and the side surface 40s2 is a surface that connects the back surface and the front surface of the light guide plate 40 between the back surface and the front surface of the light guide plate 40. Each of the side surface 40s1 and the side surface 40s2 is a surface along a direction (Z direction) perpendicular to each of the back surface and the front surface of the light guide plate 40. The light guide plate 40 is adhesively fixed to the substrate 20 via the adhesive layer 41. In at least the display region DA, a gap between the light guide plate 40 and the substrate 20 is filled with the adhesive layer 41.

The low refractive index layer 42 is interposed in a part of a region between the back surface of the light guide plate 40 and the front surface 41f of the adhesive layer 41. The low refractive index layer 42 has a back surface opposing the front surface of the substrate 20 and a front surface on an opposite side of the back surface. The low refractive index layer 42 does not cover the entire front surface 41f of the adhesive layer 41 in the display region DA, but covers the front surface 41f of the adhesive layer 41 in a predetermined range from a light source unit 50 side in the display region DA. In the example shown in FIG. 2, the low refractive index layer 42 has contact with the back surface of the light guide plate 40 in the predetermined range in the display region DA, and the adhesive layer 41 is adhered to the back surface of the light guide plate 40 in a range different from the predetermined range in the display region DA. The low refractive index layer 42 has a lower refractive index than any of the substrate 10, the substrate 20, the light guide plate 30, the light guide plate 40, the adhesive layer 31, and the adhesive layer 41.

Each of the adhesive layer 31 and the adhesive layer 41 is made of a transparent resin material that can transmit visible light. As an example of the adhesive layer 31 and the adhesive layer 41 with visible light transmittivity, a transparent adhesive sheet called an OCA (Optical Clear Adhesive) formed in a sheet shape, an OCR (Optical Clear Resin) that is used by curing a liquid transparent adhesive, or the like can be exemplified.

In a case of the display panel P1 shown in FIG. 2, in order to ensure the visible light transmittivity on the front surface and the back surface, the present embodiment has a structure in which the light source unit 50 is arranged at a position that does not overlap with the display region DA. Further, the display panel P1 has a mechanism of using a refractive index difference between the light guide plate 30, light guide plate 40, substrate 10, and substrate 20 and a surrounding air layer to reflect the light source light L1, thereby delivering light to a side surface 40s2 side which is on the opposite side of the side surface 40s1 opposing the light source unit 50. To the side surface of the display panel P1 including the side surface 40s2, namely, a side surface of a laminated body including the substrate 10, the substrate 20, the light guide plate 30, the light guide plate 40, the adhesive layer 31, the adhesive layer 41, and the sealing portion SLM, a mirror 43 is bonded so that a mirror surface opposes the above-mentioned side surface.

As mentioned above, in the case of the display panel that causes the light source light to be incident from the side surface of the light guide plate to light the entire display region, there is confirmed a phenomenon in which luminance of a region far from the light source unit is lower than luminance of a region close to the light source unit in the display region. Here, this phenomenon is referred to as a luminance gradient phenomenon. In order to suppress such a luminance gradient phenomenon, in the display panel P1 of the present embodiment, the low refractive index layer 42 is provided near the light source unit 50. Since the refractive index of the low refractive index layer 42 is smaller than the refractive index of the adhesive layer 41, the critical angle at which the light source light passing through the light guide plate 40 is totally reflected at the front surface of the low refractive index layer 42 is smaller than the critical angle for total reflection at the front surface of the adhesion layer 41f. Therefore, in the vicinity of the light source unit 50 in which the low refractive index layer 42 is formed, the light source light L1 reaching the liquid crystal layer LQL and the light guide plate 30 can be reduced, so that the luminance gradient phenomenon can be suppressed.

Here, the refractive index of each of the adhesive layer 31 and the adhesive layer 41 is 1.474. The refractive index of each of the substrate 10 and the substrate 20 is 1.51. The refractive index of the light guide plate 30 is 1.470 to 1.51. The refractive index of the light guide plate 40 is 1.470. One of main features of the present embodiment is that the refractive index of the light guide plate 40 is smaller than the refractive index of the adhesive layer 41. Namely, here, the refractive index of the light guide plate 40 on which the light source light L1 is incident from the side surface 40s1 is lower than the refractive index of any of the adhesive layer 41, the adhesive layer 31, the substrate 10, and the substrate 20.

In the display panel P1 in which each layer has such a refractive index, the total reflection can be prevented from occurring at an interface between the layers that configure the display panel P1. Therefore, the light source incident from the side surface 40s1 propagates throughout the display panel P1. Note that the total reflection of the light source light L1 at the front surface of the low refractive index layer 42, which is lower in refractive index than the light guide plate 40, is not a problem because it follows an intention of providing the low refractive index layer 42 to suppress the luminance gradient phenomenon.

That is, as schematically shown by a dash-single-dot line in FIG. 2, the light source light L1 emitted from the light source unit 50 propagates in a direction away from the side surface 40s1 while being reflected on the back surface of the light guide plate 30 and the front surface of the light guide plate 40. Thereafter, the light source light L1 reflected by the mirror 43 propagates to an opposite side (a side surface side of the display panel P1 including the side surface 40s1) while being reflected on the back surface of the light guide plate 30 and the front surface of the light guide plate 40.

The liquid crystal LQ is a polymer dispersed liquid crystal (PDLC), and contains a liquid crystal polymer and liquid crystal molecules. An orientation direction of the liquid crystalline polymer hardly changes regardless of the presence or absence of an electric field. Meanwhile, an orientation direction of the liquid crystal molecules changes depending on the electric field when a high voltage equal to or higher than a threshold voltage is applied to the liquid crystal LQ. When no voltage is applied to the liquid crystal LQ, optical axes of the liquid crystal polymer and liquid crystal molecules are parallel to each other and most of the light source light L1 incident on the liquid crystal layer LQL is hardly scattered in the liquid crystal layer LQL but is transmissive (transparent state). When the voltage is applied to the liquid crystal LQ, the optical axes of the liquid crystal polymer and the liquid crystal molecules intersect with each other and the light source light L1 incident on the liquid crystal LQ is scattered within the liquid crystal layer LQL (scattering state). The display panel P1 controls the transparent state and the scattering state by controlling an orientation of the liquid crystal LQ in a propagation path of the light source light L1. In the scattering state, the light source light L1 is emitted as emission light L2 by the liquid crystal LQ from a front side of the light guide plate 40 and a back side of the light guide plate 30 to the outside of the display panel P1. The emission light L2 and background light L3 are visible, for example, to an observer located on the front side of the light guide plate 40. The observer can recognize the emission light L2 and the background light L3 in combination. In this way, the observer using the transparent display panel can recognize the displayed image and the background by superimposing them.

Effects of Present Embodiment

As explained by using the first comparative example and the second comparative example shown in FIGS. 4 and 5, in the transparent display device, if the refractive index of the light guide plate is not selected appropriately, there is first room for improvement in that if the refractive index of the light guide plate is not selected appropriately, the light source light will not reach the liquid crystal layer and the luminance decreases. Moreover, in such a case, there is second room for improvement in that the measures such as the increase in the thickness of the light guide plate to improve the luminance gradient are not sufficiently effective.

In contrast, in the display device of the present embodiment, the refractive index of the light guide plate 40 shown in FIG. 2 is set to be smaller than the refractive index of the adhesive layer 41. As a result, the refractive index of the light guide plate 40 on which the light source light L1 is incident from the side surface 40s1 is lower than the refractive index of any of the adhesive layer 41, the adhesive layer 31, the substrate 10, and the substrate 20.

In the display panel P1 in which each layer has such a refractive index, the total reflection can be prevented from occurring at the interface between the layers that configure the display panel P1. Therefore, the light source incident from the side surface 40s1 propagates throughout the display panel P1. As a result, a decrease in the luminance of the display panel P1 due to the total reflection can be prevented, so that the first room for improvement can be resolved, and the performance of the display device can be improved.

Figure 3:
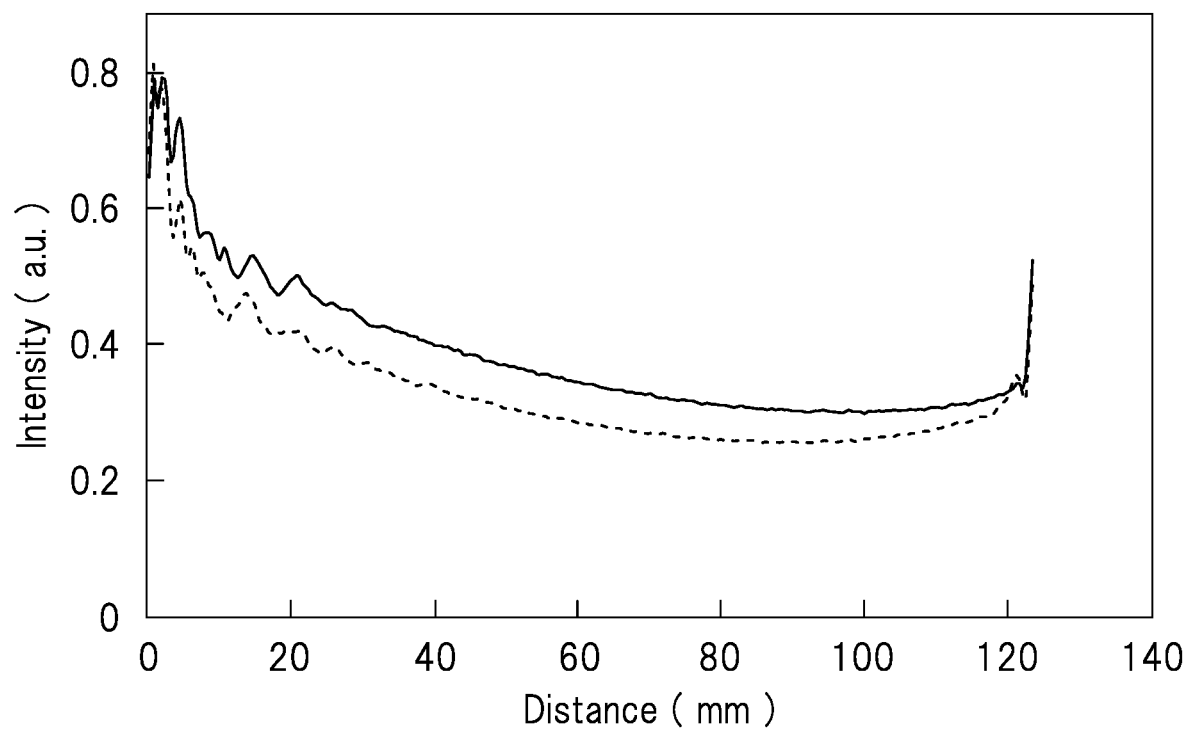
FIG. 3 is a graph showing a relationship between a distance from a light incident side and an intensity of luminance in the transparent display device.

FIG. 3 shows a graph of a relationship between a distance from a light incident side (horizontal axis) and an intensity of the luminance (vertical axis) as a result of an experiment conducted by the inventors of the present application. The distance from the light incident side, which is the horizontal axis, indicates a distance from the side surface 40s1 of the light guide plate 40 in the Y direction of FIG. 2. In FIG. 3, a graph of the luminance measured in the display panel PA of the first comparative example is shown by a broken line. Namely, the graph of the broken line is a graph showing the luminance when the refractive index of the adhesive layer 41 is 1.476 and the refractive index of the light guide plate 40 is 1.51. Further, in FIG. 3, a graph of a solid line shows the luminance when the refractive index of the adhesive layer 41 is 1.476 and, unlike the first comparative example, the refractive index of the light guide plate 40 is 1.472.

As shown in FIG. 3, it has found that when the refractive index of the light guide plate 40 is smaller than the refractive index of the adhesive layer 41, the luminance is improved at about 20% in comparison with a case where the refractive index of the light guide plate 40 is larger than the refractive index of the adhesive layer 41. In the present embodiment, by making the refractive index of the light guide plate 40 smaller than the refractive index of the adhesive layer 41, the effect of improving the luminance of the display panel P1 as shown in FIG. 3 can be obtained.

The above effect can be obtained even if the refractive index of the light guide plate 30 is the same as the refractive index of the light guide plate 40. In this case, the light source light L1 incident on the front surface 30f of the light guide plate 30 from the adhesive layer 31 side can be prevented from being totally reflected at the front surface 30f of the light guide plate 30, which is the interface between the adhesive layer 31 and the light guide plate 30. By the light source light L1 propagating to the light guide plate 30, the effect of the light guide due to providing the light guide plate 30 can be obtained. Namely, for example, by increasing the thickness of the light guide plate 30, the effect of suppressing the luminance gradient phenomenon can be obtained. Therefore, the second room for improvement can be resolved, and the performance of the display device can be improved.

Here, the refractive index of the light guide plate 30 may be set larger than the refractive index of the light guide plate 40. In this case, the total reflection at the front surface 30f of the light guide plate 30 by the light source light L1 incident onto the front surface 30f of the light guide plate 30 from the adhesive layer 31 side can be more effectively prevented.

Further, here, a case where the refractive index of each of the substrate 10 and the substrate 20 is larger than the refractive index of the light guide plate 40 has been described, but the refractive index of each of the substrate 10 and the substrate 20 may be the same as the refractive index of the light guide plate 40. By aligning the refractive indexes of the layers that configure the display panel P1, the number of places on which the light source light is incident from the layer with the high refractive index to the layer with the low refractive index can be reduced, so that the occurrence of the total reflection in the display panel P1 is suppressed. In this case, from the point of view of preventing the luminance of the display panel P1 from being reduced by causing the light source light L1 to be incident onto the liquid crystal layer LQL, the refractive index of each of the substrate 10 and the substrate 20 is desirably larger than or equal to the refractive index of the light guide plate 30.

Although the embodiments and the typical modification examples have been described above, the above-described technique can be applied to various modification examples other than the illustrated modification examples. For example, the above-described modification examples may be combined.

It is understood that various change examples and modification examples can be arrived at by those skilled in the art within the scope of the idea of the present invention, and these change examples and modification examples also fall within the scope of the present invention. For example, as long as what those skilled in the art appropriately make addition, deletion, or design change of the components or make addition, deletion, or condition change of the process with respect to the above-mentioned respective embodiment has the gist of the present invention, it falls within the scope of the present invention.

What is claimed is:

1. A display device comprising:
   a first substrate having a first front surface and a first back surface located on an opposite side of the first front surface;
   a second substrate having a second back surface opposing the first front surface and a second front surface located on an opposite side of the second back surface;
   a liquid crystal layer arranged between the first front surface of the first substrate and the second back surface of the second substrate;
   a first light guide plate adhesively fixed onto the second front surface of the second substrate via a first adhesive layer; and
   a light source unit arranged at a position opposing a first side surface of the first light guide plate,
   wherein refractive index of the first light guide plate is lower than refractive index of the first adhesive layer.

2. The display device according to claim 1, further comprising a second light guide plate adhesively fixed onto the first back surface of the first substrate via a second adhesive layer,
   wherein refractive index of the second light guide plate is larger than or equal to the refractive index of the first light guide plate.

3. The display device according to claim 2,
   wherein refractive index of each of the first substrate and the second substrate is larger than or equal to the refractive index of the first light guide plate in magnitude.

4. The display device according to claim 3,
   wherein refractive index of the second adhesive layer is larger than or equal to the refractive index of the first light guide plate in magnitude.

5. The display device according to claim 4,
   wherein the refractive index of each of the first substrate and the second substrate is 1.51,
   the refractive index of each of the first adhesive layer and the second adhesive layer is 1.474, and
   the refractive index of the first light guide plate is smaller than 1.474.

* * * * *